April 26, 1955 B. F. AMBROSIO 2,707,209

FREQUENCY SHIFT RECEIVER CONVERTERS

Filed Nov. 17, 1953 2 Sheets-Sheet 1

INVENTOR.
Biagio F. Ambrosio
BY D. C. Snyder
G. R. McCready
ATTORNEYS.

April 26, 1955 B. F. AMBROSIO 2,707,209

FREQUENCY SHIFT RECEIVER CONVERTERS

Filed Nov. 17, 1953 2 Sheets-Sheet 2

INVENTOR.
Biagio F. Ambrosio
BY D. C. Snyder
G. R. McCrady
ATTORNEYS.

2,707,209
Patented Apr. 26, 1955

2,707,209

FREQUENCY SHIFT RECEIVER CONVERTERS

Biagio F. Ambrosio, West Los Angeles, Calif.

Application November 17, 1953, Serial No. 392,779
4 Claims. (Cl. 178—66)
(Granted under Title 35, U. S. Code (1952), sec. 266)

The invention described herein may be manufactured and used by or for the Government of the United States of America for governmental purposes without the payment of any royalties thereon or therefor.

This invention relates to radio telegraph systems, and more particularly to a system for reducing the effects of interference on frequency shift receiver converters.

In the reception of electrical pulses in a teletypewriter communication system, it is desirable that the effects of interference be minimized. Pulses may be transmitted by a continuous process such as frequency shift, in which communication of intelligence is accomplished by varying the frequency of the signaling wave. Such a system operates with a signal which is continuous in the sense that a signal is always present. Severe intereference will, however, disrupt the continuity of the process which is normally not disturbed by interference merely causing amplitude variations which are eliminated in a limiter circuit. In the instant invention, full advantage is taken of the continuous nature of frequency shift transmission by causing vacuum tubes to be gated shut when the incoming signal has been mutilated or is missing. The gating action is thus controlled by the signal input in such manner that the circuits in which the income information is actually utilized are unaffected by gaps in the incoming signal.

An object of the invention is to provide an improved apparatus for the reception of radio signals.

A further object is to provide an efficient interference rejection system for frequency shift receiver converters.

Other objects and many of the attendant advantages of this invention will be readily appreciated as the same becomes better understood by reference to the following description.

Figure 1:
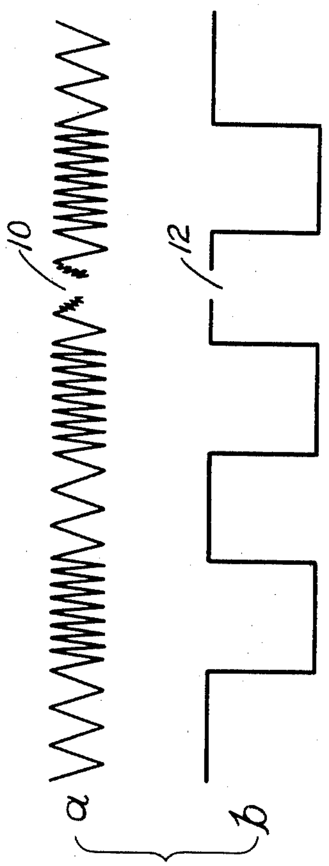
Fig. 1 is a diagrammatic view showing the relation of a normally continuous signal to the transmitted information in the form of pulses.

In Fig. 1(*a*) ia typical radio teletypewriter frequency shift signal is shown. The pulse configuration resulting from the detection operation performed in a discriminator circuit on the input signal is shown at Fig. 1(*b*). It will be noted that the interruption 10 in the input signal results in a correspondingly located mutilated pulse 12, which will interfere with subsequent pulse controlled operations unless the receiver is prevented from accepting the mutilated pulse as desired signals are accepted.

Figure 2:
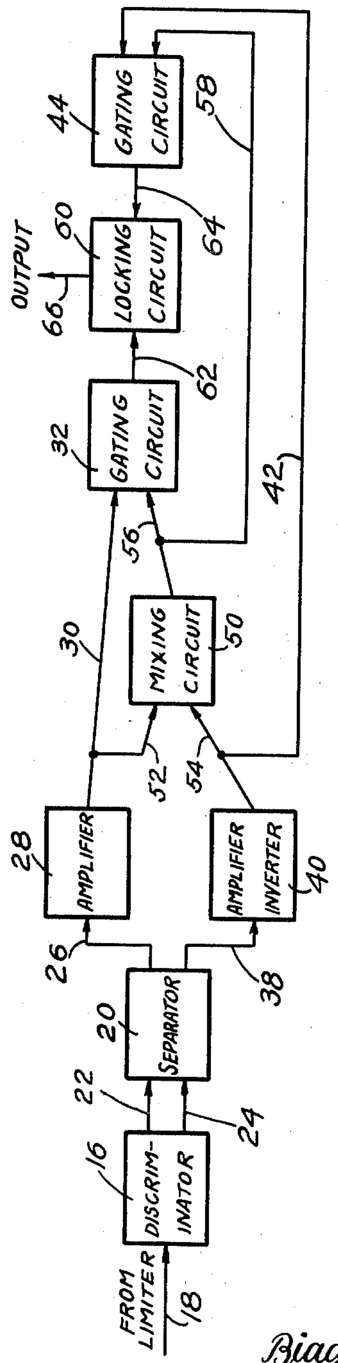
Fig. 2 is a block diagram of a circuit embodying the invention.

In Fig. 2, an input to discriminator 16 is provided through lead 18. Discriminator 16 is connected to separator 20 through leads 22 and 24. One output of separator 20 passes through lead 26, amplifier 28, and lead 30 to gating circuit 32. The other output of separator 20 passes through lead 38, amplifier-inverter 40, and lead 42 to gating circuit 44. Mixing circuit 50 receives signals from amplifier 28 and amplifier-inverter 40, over leads 52 and 54, respectively. The output of mixing circuit 50 is fed into gating circuits 32 and 44 through leads 56 and 58, respectively, and the gating circuits are connected to locking circuit 60 by means of leads 62 and 64. Locking circuit 60 is provided with output lead 66.

In the operation of the above described apparatus a signal of varying frequency is fed into discriminator 16. Lead 18 is normally connected to the limiter stage of a radio receiver although the signal may be obtained from other sources if desired. The discriminator output of alternately positive and negative pulses is separated into a series of positive pulses which are amplified in amplifier 28 and a series of negative pulses which are amplified and then inverted in amplifier-inverter 40 to form additional positive pulses. Both series of positive pulses are fed into mixing circuit 50 which holds gating circuits 32 and 44 open as long as there are no interruptions in incoming signals. When the gates are open, the outputs of amplifier 28 and amplifier-inverter 40 pass through the gating circuit to locking circuit 60 which is thereby directed to perform certain steps. However, if the signal into the discriminator is not continuous due to interference, the resulting lack of pulses to mixing circuit 50 brings about a closing of gates 32 and 44. Since locking circuit 60 is isolated by the closing of the gating circuit, it cannot respond to erroneous signals produced as a result of the interference.

Figure 3:
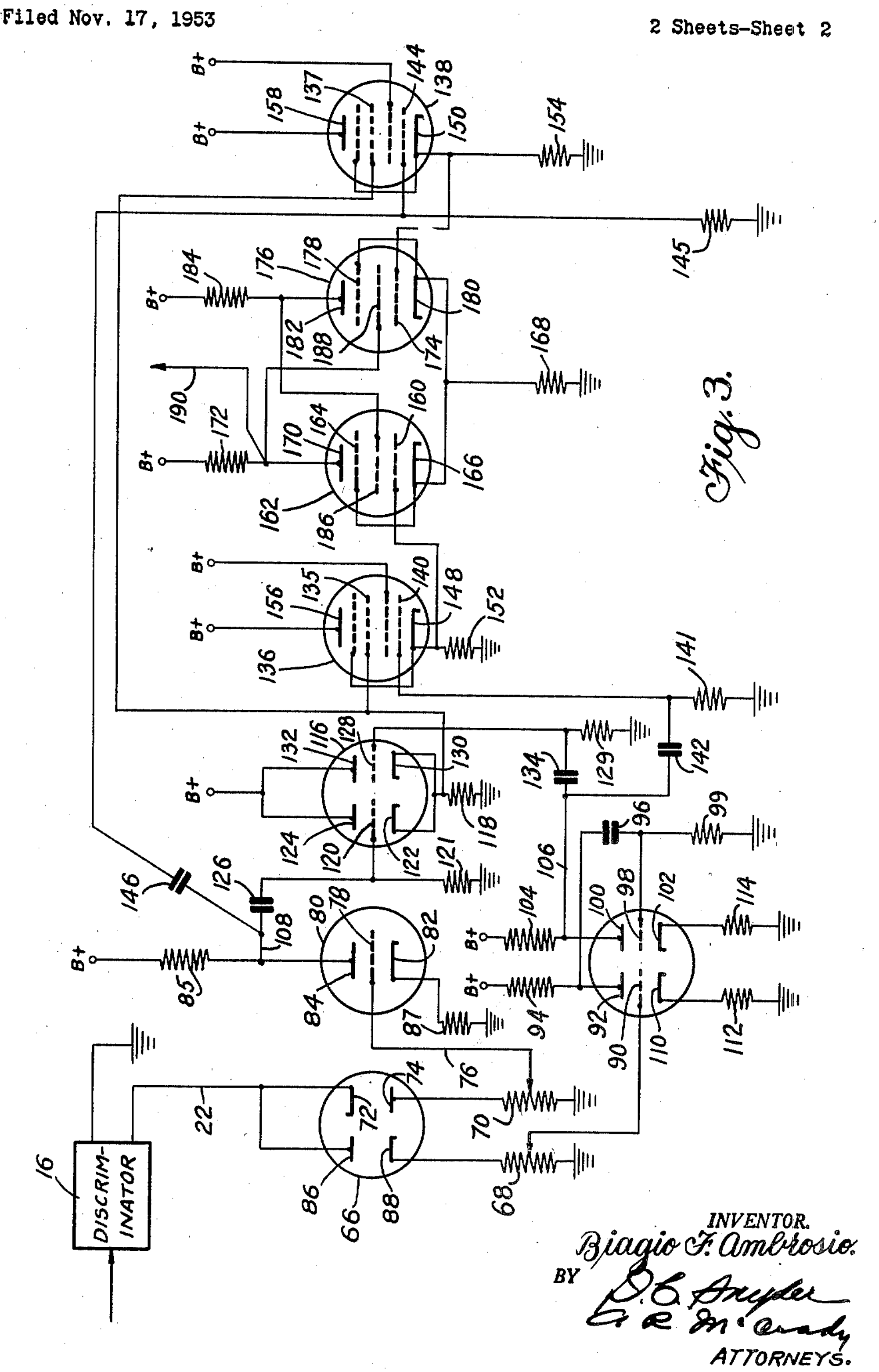
Fig. 3 is a schematic diagram of the embodiment shown in Fig. 2.

A schematic diagram of an interference rejection system in a frequency shift receiver is shown in Fig. 3. The output of discriminator 16 is connected to a separator which consists of a twin diode 66 such as a type 6HL5 tube having voltage dividers 68 and 70 for taking off the ouput. When the polarity of the signal on lead 22 is negative, the flow of electrons through cathode 72, plate 74, voltage divider 70, and lead 76 results in a signal being impressed upon grid 78 of triode 80 which is provided with cathode 82 and plate 84. Plate resistor 85 is connected to a source of B plus voltage, and the cathode is taken to ground through resistor 87. When the polarity of the signal on lead 22 is reversed, the electron flow through plate 86, cathode 88 and voltage divider 68 results in the presence of a signal on grid 90 in one of two triodes of what may conveniently be a 2C51 tube. Grid 90 controls the voltage on plate 92, which is connected to a B plus voltage through resistor 94, and the voltage across the plate resistor is coupled through capacitor 96 to control grid 98. Grid 98 is connected to ground through grid resistor 99. The action of plate 100 and cathode 102 acting in conjunction with grid 98 brings about a 180° phase shift, so that the output across resistor 104 on lead 106 now represents positive pulses just the same as the pulses on plate lead 108 of tube 80. Cathode 110 is connected to ground through resistor 112, and cathode 102 is similarly connected through resistor 114. Cathode heaters for all tubes in the circuit diagram are not shown but will be understood. The mixer circuit comprises a twin triode 116, which may conveniently be a 2C51 tube, and cathode follower resistor 118. Grid 120, which controls current flow between cathode 122 and plate 124, is connected to plate lead 108 through capacitor 126. Grid 128, which controls current flow between cathode 130 and plate 132, is connected to plate lead 106 through capacitor 134. Grids 120 and 128 are connected to ground through grid resistors 121 and 129 respectively. The cathode follower output across resistor 118 is connected to the number three grids 135 and 137, of gating tubes 136 and 138 respectively which may conveniently be hexodes. The number one or control grid 140 of tube 136 is connected through capacitor 142 to plate lead 106, and the control grid 144 of tube 138 is connected through capacitor 146 to plate lead 108. In tubes 136 and 138 respectively cathodes 148 and 150 are taken to ground through resistors 152 and 154, the number four grid of each tube is connected to the cathode in that tube, plates 156 and 158 are connected to a B plus voltage source, and the number two grids are connected to a positive B plus voltage as indicated. Grids 140 and 144 are connected to ground through grid resistors 141 and 145 respectively.

The locking circuit comprises two pentodes which may be type 6SJ7 tubes. Control grid 160 of pentode 162 is connected to cathode 148 of tube 136. Supressor grid 164 and cathode 166 are connected to ground through resistor 168, and plate 170 is connected to a B plus supply through resistor 172. The control grid 174 of pentode 176 is connected to cathode 150 of tube 138. Suppressor grid 178 and cathode 180 are connected to ground through resistor 168 and the plate 182 is connected to a B plus supply through resistor 184. Screen grid 186 of tube 162 is connected to the plate of tube 176, and screen grid 188 of tube 176 is connected to the plate 170 of tube 162. The output of the locking circuit is made available on lead 190 which is connected to plate 170.

In the operation of the above described circuit, incoming signals from discriminator 16 are separated into positive and negative pulses in tube 66. The negative pulses are amplified in tube 80; the positive pulses are amplified by means of the triode controlled by grid 90. The output of this first triode section is applied to grid 98 of the second triode section which produces an output having the same sense as the output of tube 80. As long as either the triode of tube 80 or the triode controlled by grid 98 is conducting, one of the triodes in tube 116 will also conduct, and thus will produce a voltage across resistor 118. The signal on resistor 118 is applied to the number three grid of tubes 136 and 138; the tubes are gated shut when a signal is not present on both of these grids. When the gating tubes are cut off there will be no voltage across cathode resistors 152 and 154 effective to trigger the multivibrator circuit comprising tubes 162 and 176. When tubes 136 and 158 are not gated shut, the voltages across their cathode resistors are controlled by the outputs of triode 80 and the triode associated with grid 98. The locking circuit consists of two pentodes each having its screen grid cross connected to the plate of the other tube. Resistors 172, 184 and 168 are so selected that a positive pulse is required to drive the non-conducting tube to conduction; the circuit will hold its existing state as long as additional positive pulses are not received. The cathode follower outputs of tubes 136 and 138 feed only positive pulses to the locking circuit. A positive pulse applied to grid 160 will cause tube 162 to conduct, and there will therefore be a low voltage across resistor 172. This low voltage is applied to screen grid 188 thus cutting off plate current in tube 176, the cut-off bias being supplied by common cathode resistor 168. The lack of plate current through resistor 184 results in a high voltage being applied to screen grid 186 thereby allowing tube 162 to continue conduction. When a positive pulse is fed to grid 174 the situation is reversed, and tube 176 conducts and tube 162 is cut off. If the pulse to grid 174 is broken up, as by interference, tube 176 continues to conduct since grid 160 has not received a pulse and in fact cannot receive a pulse since tube 136 along with tube 138 has been gated shut when the incoming signal ceased to produce a voltage across cathode resistor 118. The system can readily be constructed to utilize negative pulses to control the mixer and locking circuits.

Obviously many modifications and variations of the present invention are possible in the light of the above teachings. It is therefore to be understood that within the scope of the appended claims the invention may be practiced otherwise than as specifically described.

What is claimed is:

1. In a frequency-shift receiver system, a receiver designed to receive positive and negative pulses, means for separating the positive from the negative pulses and inverting the negative pulses, a locking circuit, two gating circuits connected to the locking circuit to control the same, and connected to receive respectively the positive and the inverted negative pulses, said gating circuits being rendered inoperative by interruption of either of said pulses.

2. In a frequency-shift receiver converter, an interference rejector comprising a separator for separating the positive from negative pulses, a first amplifier connected effective to amplify positive pulses from said separator, a second amplifier connected effective to amplify negative pulses from said separator, an inverter connected effective to invert said negative pulses, a mixer connected effective to receive the outputs of said first amplifier and said inverter as an input and to produce a cathode follower output signal when and only when positive pulses are being received, two gating circuits each connected to the output of said mixer and effective to pass pulses only when said mixer produces an output signal, means for connecting said first amplifier to one of said gating circuits, means for connecting said inverter to the other of said gating circuits, and a multivibrator circuit connected to and controlled by pulses passing through said gating circuit.

3. An interference rejection circuit for a frequency shift teletypewriter system, comprising a discriminator, separator means connected to said discriminator and effective to separate negative and positive pulses from said discriminator, amplifying means connected to amplify said positive pulses, amplifier-inverter means connected to amplify and invert said negative pulses, a teletypewriter locking circuit, two generally similar gating circuits, means connecting the output of said amplifier means through one of said gating circuits to said locking circuit, means connecting the output of said amplifier-inverter means through the other of said gating circuits to said locking circuits, and a mixing circuit connected to said amplifier and said amplifier-inverter effective to receive positive input pulses and in response thereto control the gating action of said gating circuits.

4. An interference rejection circuit for a frequency-shift teletypewriter system, comprising a discriminator, separator means connected to said discriminator and effective to separate negative and positive pulses from said discriminator, amplifying means connected to amplify said negative pulses, amplifier-inverter means connected to amplify and invert said positive pulses, a teletypewriter locking circuit, two generally similar gating circuits, means connecting the output of said amplifier means through one of said gating circuits to said locking circuit, means connecting the output of said amplifier-inverter means through the other of said gating circuits to said locking circuits, and a mixing circuit connected to said amplifier and said amplifier-inverter effective to receive negative input pulses and in response thereto control the gating action of said gating circuits.

References Cited in the file of this patent

UNITED STATES PATENTS

| | | |
|---|---|---|
| 2,549,776 | Cleeton | Apr. 24, 1951 |
| 2,662,934 | Allison | Dec. 15, 1953 |
| 2,677,014 | Moynihan | Apr. 27, 1954 |